(12) United States Patent
Kim

(10) Patent No.: US 9,140,720 B2
(45) Date of Patent: Sep. 22, 2015

(54) FEEDBACK CONTROLLER IN PROBE MICROSCOPE UTILIZING A SWITCH AND A INVERTER

(71) Applicant: Boise State University, Boise, ID (US)

(72) Inventor: Byung I. Kim, Boise, ID (US)

(73) Assignee: BOISE STATE UNIVERSITY, Boise, ID (US)

(*) Notice: Subject to any disclaimer, the term of this patent is extended or adjusted under 35 U.S.C. 154(b) by 0 days.

(21) Appl. No.: 13/935,706

(22) Filed: Jul. 5, 2013

(65) Prior Publication Data
US 2013/0298294 A1 Nov. 7, 2013

Related U.S. Application Data

(63) Continuation of application No. 13/875,122, filed on May 1, 2013, which is a continuation of application No. 13/286,059, filed on Oct. 31, 2011, now abandoned, which is a continuation of application No. 12/757,542, filed on Apr. 9, 2010, now Pat. No. 8,549,660.

(51) Int. Cl.
*G01Q 20/00* (2010.01)
*G01Q 20/02* (2010.01)
(Continued)

(52) U.S. Cl.
CPC ............... *G01Q 20/02* (2013.01); *G01Q 30/14* (2013.01); *G01Q 60/32* (2013.01); *G01Q 60/36* (2013.01); *G01Q 60/38* (2013.01); *G01Q 70/10* (2013.01); *B82Y 35/00* (2013.01)

(58) Field of Classification Search
CPC ....... G01Q 60/32; G01Q 60/36; G01Q 10/065
USPC ......................................... 850/1, 2, 3, 4, 6, 7
See application file for complete search history.

(56) References Cited

U.S. PATENT DOCUMENTS 5,267,471 A * 12/1993 Abraham et al. ............... 850/37
5,329,236 A    7/1994 Gemma et al.
(Continued)

FOREIGN PATENT DOCUMENTS

| JP | 3140842 | 6/1991 |
| JP | 6174459 | 6/1994 |
| JP | 2002107284 | 4/2002 |

OTHER PUBLICATIONS

SmartSPM ("Smart SPM (TM) Instruction Manual", (c) 2007-2009, AIST-NT, Version Feb. 26, 2010).*
(Continued)

*Primary Examiner* — Brooke Purinton
(74) *Attorney, Agent, or Firm* — Parsons Behle & Latimer

(57) ABSTRACT

A method of measuring properties of a sample, the method comprising: measuring a deflection of a cantilever of a COIFM; measuring a voltage at an actuator contacting the cantilever and configured to counteract the deflection of the cantilever; measuring a voltage at a scan signal source, wherein the scan signal source is communicably coupled to the piezotube and configured to move the piezotube along an X- and a Y-axis; measuring a voltage at a feedback controller, wherein the feedback controller is communicably coupled to the piezotube and configured to move the piezotube along a Z-axis; switching a switch from a first position to a second position; switching the switch to a third position; correlating at least one of the measurements to (i) a repulsive force, and (ii) an attractive force.

12 Claims, 8 Drawing Sheets

(51) Int. Cl.
- *G01Q 60/32* (2010.01)
- *G01Q 60/36* (2010.01)
- *G01Q 30/14* (2010.01)
- *G01Q 60/38* (2010.01)
- *G01Q 70/10* (2010.01)
- *B82Y 35/00* (2011.01)

(56) References Cited

U.S. PATENT DOCUMENTS

| | | | |
|---|---|---|---|
| 5,357,105 | A | 10/1994 | Harp et al. |
| 5,821,409 | A | 10/1998 | Honma et al. |
| 5,877,497 | A * | 3/1999 | Binnig et al. ............ 850/10 |
| 6,006,594 | A | 12/1999 | Karrai et al. |
| 6,073,485 | A * | 6/2000 | Kitamura ............ 850/11 |
| 6,075,585 | A * | 6/2000 | Minne et al. ............ 250/234 |
| 6,388,239 | B1 | 5/2002 | Muramatsu |
| 6,452,170 | B1 | 9/2002 | Zypman et al. |
| 6,530,266 | B1 | 3/2003 | Adderton et al. |
| 6,583,411 | B1 | 6/2003 | Altmann et al. |
| 6,596,992 | B2 | 7/2003 | Ando et al. |
| 6,672,144 | B2 | 1/2004 | Adderton et al. |
| 6,708,556 | B1 | 3/2004 | Kim et al. |
| 6,713,743 | B2 | 3/2004 | Kim et al. |
| 6,718,821 | B1 | 4/2004 | Houston et al. |
| 6,806,958 | B2 | 10/2004 | Kojima et al. |
| 6,862,921 | B2 | 3/2005 | Chand et al. |
| 6,929,934 | B1 | 8/2005 | Korchev et al. |
| 6,975,129 | B2 | 12/2005 | Chang |
| 7,093,509 | B2 | 8/2006 | Shao et al. |
| 7,105,301 | B2 | 9/2006 | Su et al. |
| 7,204,131 | B2 | 4/2007 | Adderton et al. |
| 7,234,343 | B2 | 6/2007 | Ducker et al. |
| 7,241,994 | B2 | 7/2007 | Hasegawa et al. |
| 7,278,296 | B2 | 10/2007 | Kitamura |
| 7,347,085 | B2 | 3/2008 | Taber |
| 7,425,698 | B2 | 9/2008 | Warren et al. |
| 2002/0104963 | A1 | 8/2002 | Mancevski |
| 2006/0255818 | A1 | 11/2006 | Altmann et al. |
| 2007/0119241 | A1* | 5/2007 | Su et al. ............ 73/105 |
| 2007/0290130 | A1 | 12/2007 | Shikakura et al. |
| 2008/0022759 | A1* | 1/2008 | Su et al. ............ 73/105 |
| 2008/0307864 | A1 | 12/2008 | Uchihashi et al. |
| 2009/0032706 | A1 | 2/2009 | Prater et al. |
| 2009/0045336 | A1 | 2/2009 | Bloess et al. |
| 2009/0229020 | A1 | 9/2009 | Adams et al. |
| 2010/0154085 | A1 | 6/2010 | Maruyama et al. |
| 2011/0271412 | A1* | 11/2011 | Rychen ............ 850/21 |
| 2013/0047302 | A1* | 2/2013 | Noel et al. ............ 850/6 |

OTHER PUBLICATIONS

Bonander et al., "Cantilever Based Optical Interfacial Force Microscope", Mar. 14, 2008, pp. 13, vol. 92, No. 103124, Publisher: Applied Physics Letters.

T. Sulcheck et al, "High-speed atomic force microscopy in liquid", May 2000, pp. 2097-2099, vol. 71, No. 5, Review of Scientific Instruments, American Institute of Physics.

Byung Kim, "IDBR: RUI: Development of a Cantilever Based Optical Interfacial Force Microscope", Mar. 25, 2010, Award No. 0852886, National Science Foundation, Division of Biological Infrastructure.

Kim et al, "Humidity Dependent Ordering of Water and Its Effect on Adhesion and Friction between Silica Surfaces", Oct. 14, 2007, vol. Abstract # 1353, AVS 54th International Symposium, Tribology Featured Topic.

Kim, et al., "Simultaneous Measurement of Normal and Friction Forces Using Cantilever-Based Optical Interfacial Force Microscope", May 31, 2011, Review of Scientific Instruments, vol. 82, pp. 053711-1 through 5.

Kim, et al., Large Oscillatory Forces Generated by Interfacial Water under Lateral Modulation between Two Hydrophilic Surfaces, Applied Physics Letters/ vol. 99/ Issue 20, pp. 1 through 13, Oct. 22, 2011.

Kim et al., "Scanning Probe Microscopy of Interfacial Water Confined Between Silica Surfaces", Nov. 8, 2009, Abstract # 1070, AVS 56th International Symposium & Exhibition, Surface Science Division.

Kim, et al., "Mechanical Property Investigation of Soft Materials by Cantilever-Based Optical Interfacial Force Microscopy", Wiley Periodicals, Inc., vol. 00, 1-9 (2012).

Kim, et al. "Force-Feedback High-Speed Atomic Force Microscope for Studying Large Biological", Manuscript Number: JMIC-D-12-00020R1.

* cited by examiner

FEEDBACK CONTROLLER IN PROBE MICROSCOPE UTILIZING A SWITCH AND A INVERTER

CROSS-REFERENCE TO RELATED APPLICATIONS

This application claims the benefit of U.S. Non-Provisional application Ser. No. 12/757,542, titled CANTILEVER-BASED OPTICAL INTERFACIAL FORCE MICROSCOPE, filed on Apr. 9, 2010, U.S. Non-Provisional application Ser. No. 13/286,059, titled CANTILEVER-BASED OPTICAL INTERFACE FORCE MICROSCOPE, filed on Oct. 31, 2011, and U.S. Non-Provisional application Ser. No. 13/875,122, titled SYSTEM AND METHOD FOR HIGH-SPEED ATOMIC FORCE MICROSCOPY, filed on May 1, 2013, which are hereby incorporated by reference in their entirety.

BACKGROUND

Traditional microscope systems are generally unable to measure intermolecular interactions accurately and cost effectively. One type of microscope system is the atomic force microscope (AFM), which has been used to image and/or measure the topography of various surfaces. AFMs, however, suffer from a mechanical instability that prevents the accurate measurement of intermolecular interactions. In particular, AFM's are generally unable to control tip snap-in during tip approach and/or tip snap-off during tip retraction. As a result, AFMs are generally unable to detect intermediate states of various intermolecular interactions such as, for example, the capillary forces between two silicon surfaces.

One limitation in the speed at which an atomic force microscopes may scan a sample is the size of the cantilever. In order to overcome this weakness, typical high-speed atomic force microscopes employ a small cantilever. However, the smaller cantilever of high-speed atomic force microscopes adds complexity to the deflection detection systems, and these systems tend to be limited to between one and ten frames per second.

Another type of microscope system is the interfacial force microscope (IFM). Traditional IFM's use an electrical detection process to measure various surface phenomena. IFM's, however, have not been widely used due to the low sensitivity and technical complexity of their electrical detection process. Thus, traditional microscope systems have generally been unable to measure intermolecular interactions accurately and cost effectively.

AFM has been used to map topographic structures and mechanical properties, such as viscoelastic and adhesional properties using modulation techniques. However, such modulation techniques may be challenging to interpret because of, among other things, a complex dependence on amplitude and phase of driving signals due to the nonlinear nature of tip-sample interaction in the contact regime.

SUMMARY

A microscopy device for measuring properties of soft materials, the device comprising: a cantilever; an actuator connected to the cantilever and configured to resist deflection of the cantilever; an optical detector configured to detect deflection of the cantilever, wherein the optical detector is communicably connected to the actuator; a piezotube arranged in proximity to the cantilever; a first feedback controller communicably connected between the optical detector and the actuator; a second feedback controller communicably connected between the optical detector and the piezotube via a switch comprising a first ON position, a second ON position, and an OFF position, and wherein the second feedback controller is configured to impel movement of the piezotube along a Z-axis when the switch is in the first ON position; a scan signal source communicably connected to the piezotube and configured to impel movement of the piezotube along an X- and a Y-axis; and an inverter coupled to the second ON position of the switch.

A system for material measurement, the system comprising: a cantilever; a piezotube arranged in proximity to the cantilever; a sample positioned on the pieztube, wherein a force between the cantilever and the sample causes the cantilever to deflect; an optical detector configured to detect deflection of the cantilever, wherein the optical detector is communicably connected to an actuator coupled to the cantilever, and further wherein the actuator is configured to resist deflection of the cantilever; a switch communicably connected to the optical detector, the switch having at least a first position, a second position, and a third position; a feedback controller communicably connected between the switch and the piezotube, wherein the feedback controller is configured to impel movement of the piezotube along a Z-axis; an inverter coupled between the optical detector and the switch; and a scan signal source coupled to the piezotube and configured to impel movement of the piezotube along an X- and a Y-axis.\

A method of measuring properties of a sample, the method comprising: measuring a deflection of a cantilever of a cantilever based optical interfacial force microscope (COIFM), wherein the deflection is in response to force between a sample on a piezotube of the COIFM and the cantilever; measuring a voltage at an actuator contacting the cantilever and configured to counteract the deflection of the cantilever; measuring a voltage at a scan signal source, wherein the scan signal source is communicably coupled to the piezotube and configured to move the piezotube along an X- and a Y-axis; measuring a voltage at a feedback controller, wherein the feedback controller is communicably coupled to the piezotube and configured to move the piezotube along a Z-axis; switching a switch from a first position to a second position; switching the switch to a third position; correlating at least one of the measurements to (i) a repulsive force, and (ii) an attractive force.

BRIEF DESCRIPTION OF THE DRAWINGS

For a more complete understanding of the present disclosure and its advantages, reference is now made to the following description taken in conjunction with the accompanying drawings, in which.

Like reference numbers and designations in the various drawings indicate like elements.

DETAILED DESCRIPTION

In the following detailed description, reference is made to the accompanying drawings that form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that various changes may be made without departing from the spirit and scope of the present disclosure. The following detailed description is, therefore, not to be taken in a limiting sense.

Figure 1:
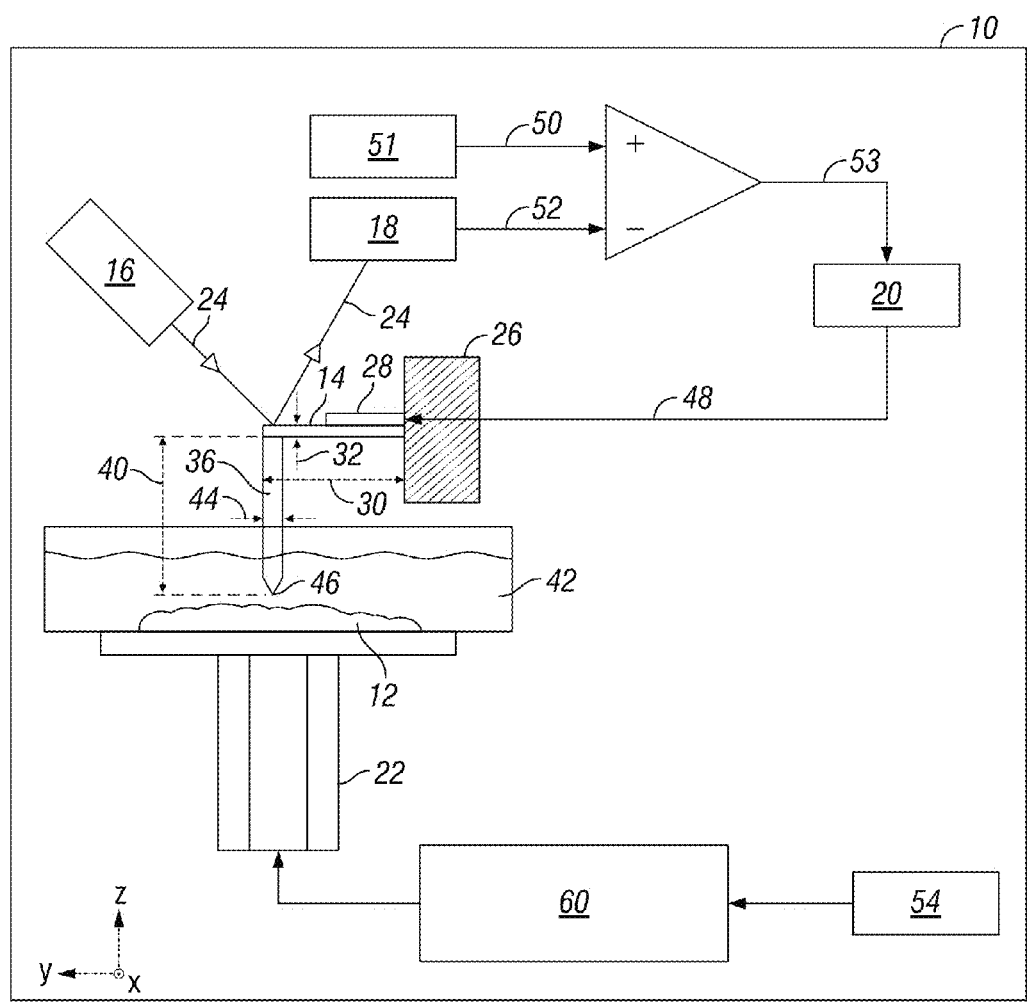
FIG. 1 illustrates a cantilever-based optical interfacial force microscope (COIFM), according to certain embodiments.

FIG. 1 illustrates a cantilever-based optical interfacial force microscope (COIFM) 10, according to certain embodiments. COIFM 10 may be configured to detect and/or measure the interfacial forces between molecules in a sample substance 12. COIFM 10 may employ an optical detection technique and a feedback loop to self-balance a cantilever 14 that senses interfacial forces in the sample substance 12. The configuration of the feedback loop and cantilever 14 may provide enhanced sensitivity of COIFM 10 to interfacial forces. In some embodiments, COIFM 10 may unveil structural and mechanical information regarding a sample substance 12 at the molecular level. COIFM 10 may comprise at least one light source 16, cantilever 14, optical detector 18, feedback controller 20, and piezotube 22.

Light source 16 may emit an optical beam 24 towards cantilever 14. Optical beam 24 from light source 16 may reflect off at least one surface of cantilever 14. Optical detector 18 may be positioned to receive optical beam 24 reflected from cantilever 14. As cantilever 14 is deflected, causing the unsupported end of cantilever 14 to move in the z-axis direction, the angle of reflection of optical beam 24 may change. Based at least in part on the angle of reflection of optical beam 24 from cantilever 14, COIFM 10 may determine the position of cantilever 14.

Light source 16 may comprise any suitable source of electromagnetic radiation. In some embodiments, light source 16 may comprise a laser such as, for example, a semiconductor laser, a solid state laser, a gas laser, a chemical laser, an excimer laser, and/or any suitable type of laser. In other embodiments, light source 16 may comprise a light-emitting diode and/or lamp emitting a low-divergence optical beam 24.

As noted above, light source 16 may emit optical beam 24 towards cantilever 14. Cantilever 14 may comprise a linear member having a fixed end attached to a support 26 and a free end that is not attached to a support. In some embodiments, cantilever 14 may project horizontally from support 26. The application of a force to the free end of cantilever 14 may cause the free end of cantilever 14 to move in the z-axis direction, resulting in deflection of cantilever 14. The application of a force to the free end of cantilever 14 may cause a torque and/or stress (e.g., shear stress, compression, and/or tension) in one or more portions of cantilever 14. In some embodiments, cantilever 14 may comprise a circuit element 28 communicatively coupled to a feedback controller 20 that prevents and/or reduces the deflection of cantilever 14.

Cantilever 14 may comprise any suitable type of structural member. In some embodiments, cantilever 14 may comprise a semiconductive material such as, for example, a doped and/or undoped silicon material. In particular embodiments, cantilever 14 may comprise phosphorus doped silicon and/or boron doped silicon. Cantilever 14 may have any suitable dimensions. In some embodiments, cantilever 14 has a length 30 from eighty (80) to one hundred and eighty (180) micrometers (μm). In particular embodiments, cantilever 14 has a length 30 from one hundred and twenty (120) to one hundred and thirty (130) μm. In some embodiments, cantilever 14 has a thickness 32 from two (2) to six (6) μm. In particular embodiments, cantilever 14 has a thickness 32 from three (3) to five (5) μm. In some embodiments, cantilever 14 has a width from forty (40) to seventy (70) μm. In particular embodiments, cantilever 14 has a width from fifty (50) to sixty (60) μm.

As noted above, cantilever 14 may comprise circuit element 28 that is communicatively coupled to feedback controller 20. In some embodiments, circuit element 28 comprises a semiconductor stack such as, for example, a zinc oxide stack. Circuit element 28 may be positioned near the fixed end (e.g., base) of cantilever 14. In conjunction with cantilever 14, circuit element 28 may act as a bimorph that controls (e.g., prevents and/or reduces) the vertical displacement of the free end of cantilever 14. Feedback controller 20 may use circuit element 28 to provide voltage activated force feedback of cantilever 14. In some embodiments, feedback controller 20 may use circuit element 28 for self-sensing of cantilever 14, for statically deflecting and/or reducing deflection of the free end of cantilever 14, and/or for oscillating and/or reducing oscillation of cantilever 14.

Cantilever 14 in COIFM 10 may be configured to measure intermolecular interactions for various sample substances. In some embodiments, cantilever 14 comprises a probe 36 affixed to the free end of cantilever 14. A sample substance may be positioned on piezotube 22 in proximity to probe 36. Intermolecular interactions between probe 36 and the sample substance 12 may exert a force on cantilever 14, causing a slight deflection of cantilever 14. Optical detector 18 may detect the deflection of cantilever 14. In response to the deflection, feedback controller 20 may adjust the voltage 48 applied to circuit element 28 in order to reduce and/or prevent further deflection of cantilever 14. Based on the voltage 48 required to prevent and/or reduce the deflection of cantilever 14, COIFM 10 may determine the interfacial forces between probe 36 and the sample substance 12. This information may be used to analyze characteristics of sample substances 12 such as, for example, interfacial adhesion, interfacial liquid structures, and/or measurements of chemical interactions.

Probe 36 of cantilever 14 may be any suitable type of probe. In some embodiments, probe 36 may be a semiconductive tip that protrudes vertically from the free end of a horizontally positioned cantilever 14. In such embodiments, probe 36 may be a pyramid-shaped tip that comprises a silicon material. The pyramid-shaped tip may resemble a spike and/or may have any suitable dimensions. For example, the pyramid-shaped tip may have a height from fifteen (15) to twenty (20) μm.

In other embodiments, probe 36 may be an optical fiber probe 36. The use of an optical fiber probe 36 may allow COIFM 10 to measure interfacial interactions in liquid environments. The optical fiber probe 36 may have a sufficient length 40 to allow the free end of the optical fiber probe 36 to penetrate a fluid 42 surrounding a sample substance 12 while cantilever 14 remains suspended above fluid 42. By keeping cantilever 14 suspended above fluid 42, COIFM 10 prevents the electrical signals of the force feedback loop from affecting the interfacial interactions between the optical fiber probe 36 and the sample substance 12. In other words, by keeping cantilever 14 and force feedback loop isolated from fluid 42, COIFM 10 may obtain accurate measurements of intermolecular interactions associated with the sample substance 12.

The optical fiber probe 36 may comprise any suitable type of optical fiber. For example, the optical fiber probe 36 may comprise a glass fiber, a plastic fiber, and/or any suitable type of optical fiber. One end of the optical fiber probe 36 may be affixed to cantilever 14 while the other end (i.e., the free end) of the optical fiber probe 36 is not affixed to any structure. The optical fiber probe 36 may be affixed to cantilever 14 using any suitable technique. For example, an end of the optical fiber probe 36 may be affixed to cantilever 14 with a thermosetting polymer such as, for example, epoxy. The optical fiber probe 36 may have any suitable dimensions. In some embodiments, the optical fiber probe 36 has a trunk diameter 44 from seventy (70) to one hundred and eighty (180) μm. In particular embodiments, the optical fiber probe 36 has a trunk diameter 44 from one hundred and twenty (120) to one hundred and thirty (130) μm. In some embodiments, the optical fiber probe 36 has a length 40 from one to two centimeters (cm). The free end of the optical fiber probe 36 may be sharpened to form a pointed end 46. In some embodiments, the pointed end 46 of the optical fiber probe 36 has a diameter from fifty (50) to one hundred and fifty (150) nanometers (nm). In particular embodiments, the pointed end 46 of the optical fiber probe 36 has a diameter from eighty (80) to one hundred and twenty (120) nm.

In some embodiments, probe 36 may comprise a wire having a sharpened tip. The tip of the wire may be sharpened according to any suitable technique such as, for example, chemical etching. Probe 36 may comprise any suitable type of wire. For example, probe 36 may comprise tungsten, titanium, chromium, and/or any suitable material.

In some embodiments, probe 36 may be coated with one or more layers of material to insulate probe 36 from liquid. A coating may be deposited over probe 36, cantilever 14, and/or both probe 36 and cantilever 14. The coating may prevent the electrical signals of the force feedback loop in COIFM 10 from affecting the interfacial interactions between probe 36 and the sample substance 12. For example, where probe 36 is a pyramid-shaped silicon tip that extends from cantilever 14, a coating on probe 36 and/or cantilever 14 may allow COIFM 10 to measure interfacial interactions in a liquid environment. To enhance the resolution and/or sensitivity of COIFM 10, the coating may not cover the apex of the tip of probe 36. The coating may comprise any suitable insulating material. For example, the coating may comprise an elastomer (e.g., silicone elastomer, polyisoprene, polyurethane, etc.), a polymer, a polyimide, and/or any suitable material.

As noted above, interfacial forces between probe 36 and the sample substance 12 may cause some deflection of cantilever 14, which may cause a change in the reflection of optical beam 24 from cantilever 14. Optical detector 18 may detect the movement of optical beam 24 reflected from cantilever 14. In some embodiments, optical detector 18 outputs to feedback controller 20 an electrical signal indicating the amount of deflection of cantilever 14. Optical detector 18 may be any suitable device that senses the presence and/or movement of optical beam 24. Optical detector 18 may comprise a transducer that converts an optical signal into an electrical signal. In some embodiments, optical detector 18 may comprise one or more laser detectors, photomultipliers, photodiodes, thermopile detectors, and/or pyroelectric energy detectors.

Feedback controller 20 may receive from optical detector 18 an electrical signal that indicates the deflection of cantilever 14. In response to the electrical signal, feedback controller 20 may adjust the voltage 48 applied to circuit element 28 on cantilever 14 in order to prevent and/or reduce the deflection of cantilever 14. The voltage 48 that is output from feedback controller 20 may be based at least in part on a voltage 50 associated with a set point 51 and a voltage 52 from optical detector 18. In some embodiments, feedback controller 20 may cause circuit element 28 to create a torque on cantilever 14 in order to achieve a zero error voltage 53.

Feedback controller 20 may comprise any suitable type of controller. For example, feedback controller 20 may be a digital controller, an analog controller, a linear gain controller, and/or a non-linear gain controller. In some embodiments, feedback controller 20 may be a proportional integral derivative (PID) controller. The voltage 48 required from feedback controller 20 to prevent and/or reduce the deflection of cantilever 14 may indicate the strength of the interfacial forces between the sample substance 12 and probe 36.

The sample substance 12 may be positioned on piezotube 22 in COIFM 10. Piezotube 22 may be coupled to a z-axis controller 54 and/or an amplifier 60, which may cause piezotube 22 to move the sample substance 12 closer to and/or further from probe 36. Thus, piezotube 22 may move the sample substance 12 in the z-axis direction. The interfacial forces measured by COIFM 10 may depend on the distance between the free end of probe 36 and the sample substance 12.

Piezotube 22 may be any suitable type of piezoelectric actuator. Piezotube 22 may comprise a ceramic and/or crystalline material that, in response to an electric field, changes in size. This property may allow piezotube 22 to position the sample substance 12 with accuracy (e.g., better than micrometer precision) in relation to probe 36 in COIFM 10. Piezotube 22 may be any suitable type of piezoelectric actuator such as, for example, a direct piezo actuator and/or an amplified piezo actuator.

COIFM 10 may be configured to measure intermolecular interactions associated with any suitable type of sample substance 12. For example, the sample substance 12 may comprise one or more biological substances such as, for example, proteins, ligands, cellular systems, and/or bacterial systems. As another example, sample substance 12 may comprise a liquid (e.g., water), which may allow COIFM 10 to measure interfacial fluid structures. As yet another example, sample substance 12 may be a solid, gaseous, and/or plasma substance.

In operation, COIFM 10 may be used to measure intermolecular interactions in a sample substance 12. The sample substance 12 may be positioned on piezotube 22 in COIFM 10. Piezotube 22 may be positioned in proximity to probe 36 suspended from the free end of cantilever 14 in COIFM 10. When COIFM 10 is activated, light source 16 may emit optical beam 24 towards cantilever 14, which may reflect optical beam 24 towards optical detector 18.

COIFM 10 may actuate piezotube 22 in the z-axis direction such that the sample substance 12 on piezotube 22 moves closer to probe 36. The interfacial forces between the molecules in the sample substance 12 and probe 36 may cause probe 36 to move closer to or further from the sample substance 12, which may cause a slight deflection of cantilever 14. The deflection of cantilever 14 may cause optical beam 24 reflected from cantilever 14 to move. The movement of optical beam 24 may be detected by optical sensor, which may, in response, transmit an electrical signal to feedback controller 20. In response to the electrical signal from optical sensor, feedback controller 20 may apply a voltage 48 to circuit element 28 affixed to cantilever 14. By applying a voltage 48 to circuit element 28, feedback controller 20 may prevent and/or reduce the deflection of cantilever 14. Based at least in part on the amount of voltage 48 required to prevent and/or reduce the deflection of cantilever 14, COIFM 10 may determine and/or indicate the strength of the interfacial forces in the sample substance 12.

Figure 2A:
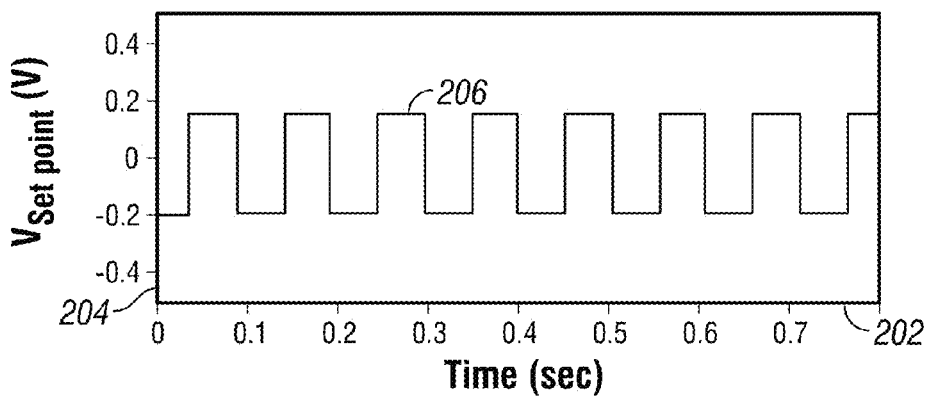
FIGS. 2A to 2D are graphs that illustrate the relationships of example electrical signals in a COIFM, according to certain embodiments.
Figure 2B:
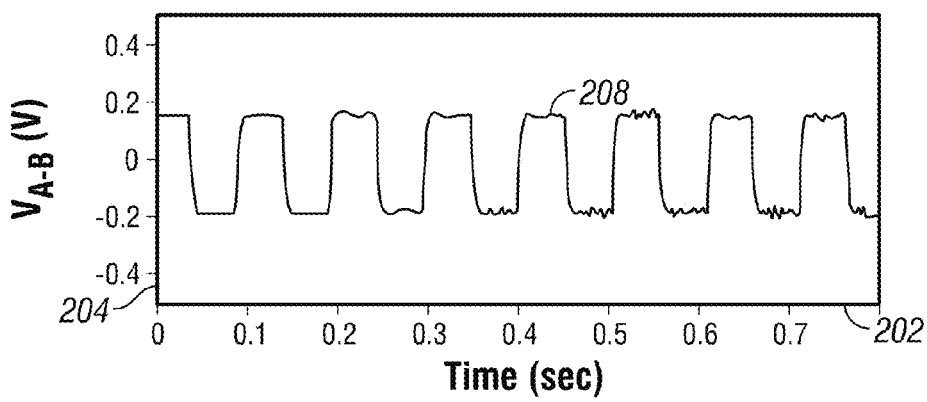
Figure 2C:
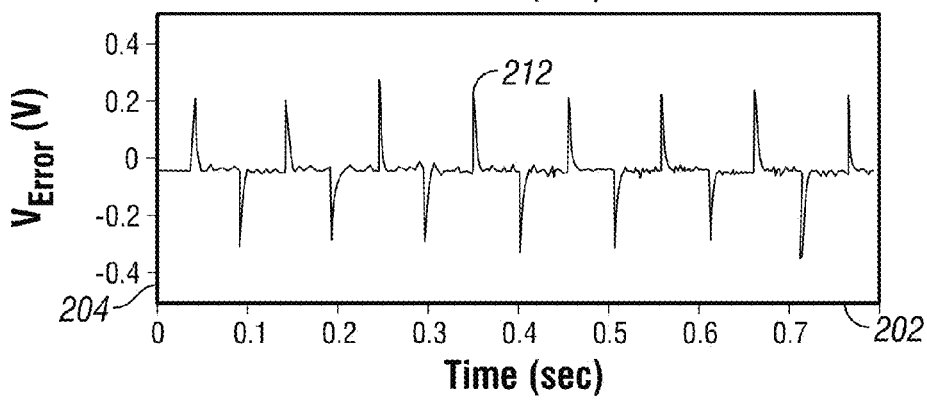
Figure 2D:
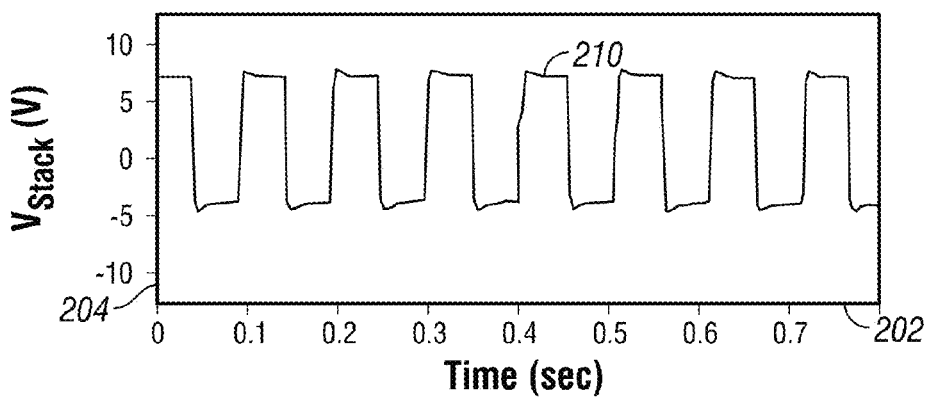

FIGS. 2A to 2D are graphs that illustrate the relationship of example electrical signals in COIFM 10, according to certain embodiments. The x-axis 202 of each graph represents time and the y-axis 204 of each graph represents a respective voltage in the feedback loop in COIFM 10. Electrical signals in COIFM 10 may be adjusted to determine the time resolution of COIFM 10. For example, as illustrated in FIG. 2A, when the sample substance 12 is not in proximity to probe 36, COIFM 10 may apply a square wave voltage with a particular amplitude (e.g., 0.2 V) and frequency (e.g., 10 Hz) to the set-point voltage ($V_{set\ point}$) 206. As illustrated in FIG. 2B, feedback controller 20 may be operable to configure the preamp output ($V_{A-B}$) 208 to follow the square wave by applying appropriate voltages ($V_{stack}$) 210 to circuit element 28 affixed to cantilever 14. The square wave may cause circuit element 28 to create a torque on cantilever 14 in order to achieve a zero error voltage ($V_{error}$) 212, as illustrated in FIG. 2C. Thus, feedback controller 20 may be configured to optimize the transient response to achieve the appropriate time response for COIFM 10. As illustrated in FIG. 2D, COIFM 10 may, in some embodiments, have a practical time resolution that is between one and two milliseconds (ms).

Although particular voltage levels and time resolutions are described above, it should be understood that COIFM 10 may be configured to operate with any suitable voltage levels and time resolutions.

Figure 3A:
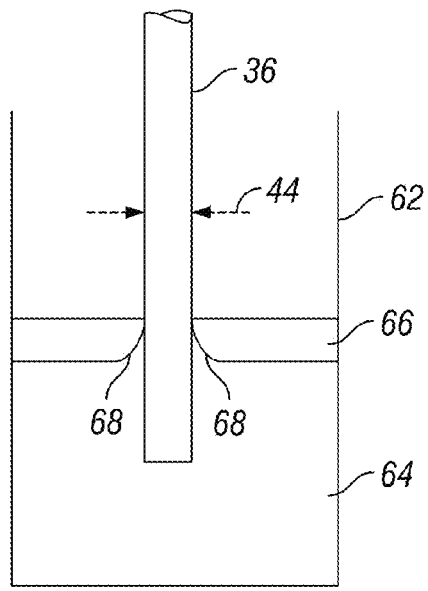
FIGS. 3A and 3B illustrate the formation of an optical fiber probe for a COIFM, according to certain embodiments.
Figure 3B:
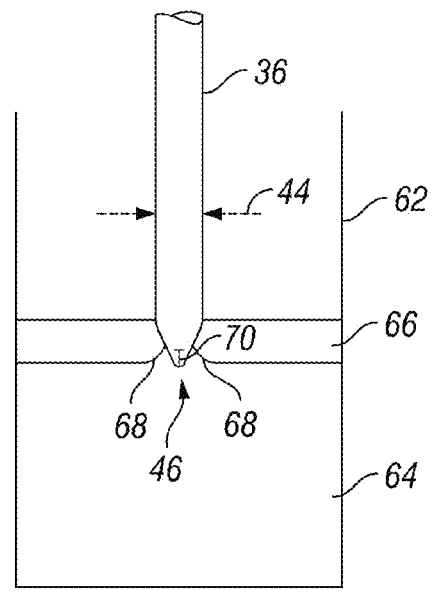

FIGS. 3A and 3B illustrate the formation of an optical fiber probe 36 for COIFM 10, according to certain embodiments. In some embodiments, a pointed end 46 may be formed on the optical fiber probe 36 by an acid etching technique.

As noted above, an optical fiber probe 36 may comprise any suitable type of optical fiber. In some embodiments, the optical fiber used to form the optical fiber probe 36 may be uncoated. In other embodiment, a coated optical fiber may be selected, and the coating may then be stripped from at least a portion of the optical fiber. The coating of the optical fiber may be removed by any suitable technique such as, for example, by using a wire stripping device.

The optical fiber may have any suitable trunk diameter 44. In some embodiments, the trunk diameter 44 of the uncoated optical fiber may be from seventy (70) to one hundred and eighty (180) μm. In particular embodiments, the trunk diameter 44 may be from one hundred and twenty (120) to one hundred and thirty (130) μm.

To form a pointed end 46 on the optical fiber probe 36, an uncoated optical fiber may be positioned vertically in a container 62. Container 62 may be any suitable type of container such as, for example, an acid resistant beaker. Once the optical fiber probe 36 is positioned in container 62, an acid 64 may be added to container 62. A sufficient quantity of acid 64 may be added such that acid 64 immerses the free end of the optical fiber probe 36. Acid 64 may be any suitable type of acid 64 such as, for example, a monoprotic acid and/or a polyprotic acid. In some embodiments, acid 64 may be a mineral acid, a sulfonic acid, and/or a carboxylic acid. In particular embodiments, acid 64 may be a hydrofluoric acid and/or a hydrochloric acid.

After acid 64 is added to container 62, a solvent 66 may be added to container 62. Solvent 66 may be less dense and/or immiscible in acid 64. Consequently, solvent 66 may form a separate layer of fluid over acid 64. The layer of solvent 66 may serve as a protective barrier to the optical fiber probe 36 so that only a controlled portion of the optical fiber probe 36 is dissolved and/or sharpened by acid 64.

Solvent 66 may be any suitable type of solvent 66 that is less dense than acid 64 and/or immiscible in acid 64. For example, solvent 66 may be an aromatic hydrocarbon such as, for example, toluene and/or benzene. As another example, solvent 66 may be hexane and/or cyclohexane.

In some embodiments, acid 64 in container 62 may form a meniscus 68 on the optical fiber probe 36. Meniscus 68 may recede as acid 64 dissolves the material (e.g., glass) in the optical fiber. Due to the formation of meniscus 68, more material (e.g., glass) may be dissolved at the immersed (e.g., distal) end of the optical fiber, which may result in the continuous narrowing of the optical fiber to create a pointed end 46. The pointed end 46 of the optical fiber may have any suitable diameter 70. In some embodiments, the diameter 70 of the pointed end 46 may be from fifty (50) to one hundred and fifty (150) nm.

The optical fiber probe 36 may be left in container 62 for any suitable period of time (e.g., sixty minutes, ninety minutes, etc.) to form the pointed end 46. Once the pointed end 46 is formed, the optical fiber probe 36 may be removed from container 62 and cleaned. In some embodiments, the pointed end 46 of the optical fiber probe 36 may be polished and/or annealed. Annealing may align the molecules in the pointed end 46 of the optical fiber probe 36 to enhance the accuracy of measurements by COIFM 10.

Although an acid etching technique is described above, it should be understood that any suitable technique may be used to form the pointed end 46 on the optical fiber probe 36. For example, the pointed end 46 on the optical fiber probe 36 may be formed by milling, dry etching, vapor etching, and/or any suitable technique. In some embodiments, the pointed end 46 may be formed on the optical fiber probe 36 by thermal heating of the optical fiber with a laser (e.g., a carbon dioxide laser). In other embodiments, the pointed end 46 may be formed on the optical fiber probe 36 by resistive heating.

In some embodiments, COIFM 10 may be used to analyze interfacial liquid structures in an ambient environment. To analyze interfacial liquid structures, COIFM 10 may measure the normal force and/or the friction force between probe 36 in COIFM 10 and the sample substance 12. Measuring the normal force may permit COIFM 10 to monitor the adhesion between probe 36 and the sample substance 12. Measuring the friction force may allow COIFM 10 to monitor the ordering of molecules in the sample substance 12. In some embodiments, the friction force may be measured by laterally modulating the sample substance 12 as it is brought into proximity with probe 36.

Figure 4:
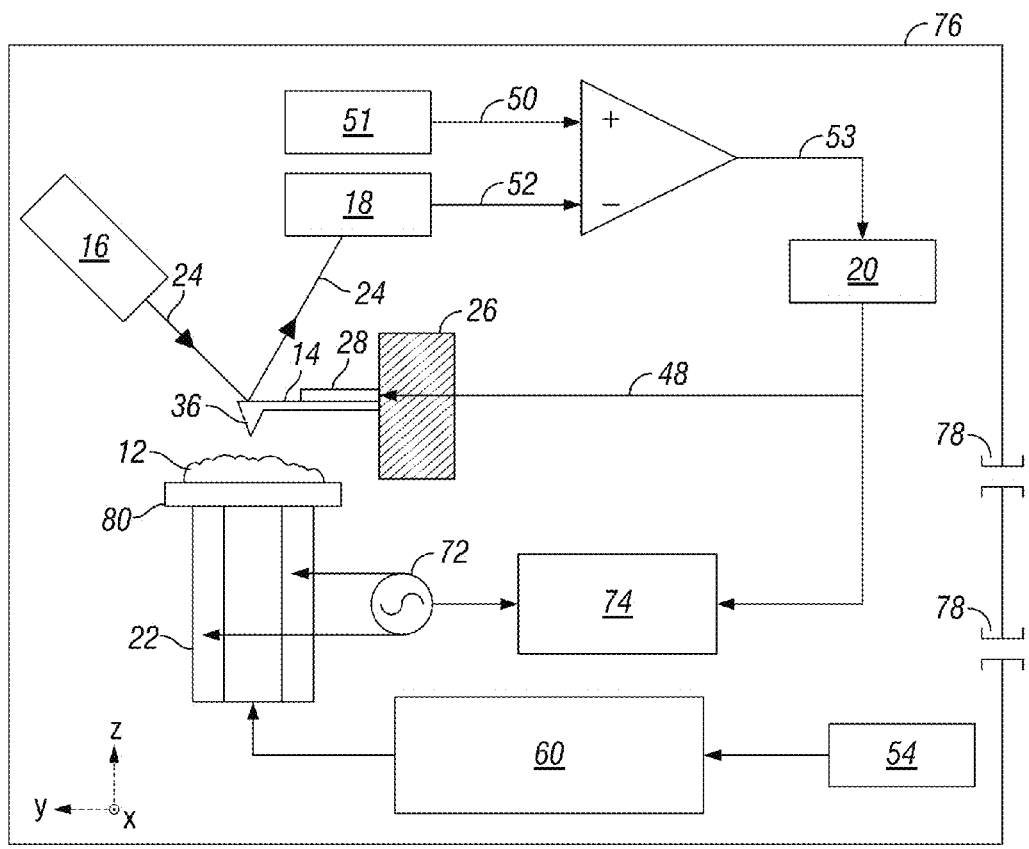
FIG. 4 illustrates a COIFM configured to analyze interfacial liquid structures by laterally modulating a sample substance, according to certain embodiments.

FIG. 4 illustrates COIFM 10 configured to analyze interfacial liquid structures by laterally modulating the sample substance 12, according to certain embodiments. COIFM 10 may comprise light source 16, cantilever 14, optical detector 18, feedback controller 20, and piezotube 22, as described above with respect to FIG. 1. COIFM 10 may further comprise a lateral modulator 72 and lock-in amplifier 74 communicatively coupled to piezotube 22 and feedback controller 20.

Lateral modulator 72 may be operable to modulate piezotube 22 in the x-axis and/or y-axis directions (also called lateral modulation). Lateral modulator 72 may comprise a voltage supply that is configured to actuate the modulation of piezotube 22. Lateral modulator 72 may be any suitable modulator such as, for example, a piezoelectric actuator. For example, piezotube 22 may comprise a ceramic structure that contracts and/or expands in the x-axis and/or y-axis directions in response to a voltage applied by the voltage supply in lateral modulator 72.

Lateral modulator 72 may be communicatively coupled to lock-in amplifier 74. Lock-in amplifier 74 may be operable to detect and/or measure the lateral modulation of piezotube 22. Lock-in amplifier 74, which may act as a homodyne with a low pass filter, may be operable to extract a signal with a known carrier wave from a noisy environment. Lock-in amplifier 74 may be operable to convert the phase (and/or related information such as in-phase and quadrature components) and amplitude of the extracted signal into a time-varying, low-frequency voltage signal. In some embodiments, lock-in amplifier 74 may be configured to measure phase shift associated with the extracted signal.

In operation, COIFM 10 may laterally modulate the sample substance 12 to gather information regarding interfacial liquid structures in the sample substance 12. In some embodiments, a sample substance 12 (e.g., a fluid) may be deposited on piezotube 22. COIFM 10 may then establish a feedback loop between optical detector 18 and circuit element 28 on cantilever 14. Piezotube 22 may then be actuated in the z-axis direction (i.e., vertically) such that the sample substance 12 is brought near to and/or in contact with the free end of probe 36 in COIFM 10. As the sample substance 12 is brought into proximity with probe 36, adhesion forces between the sample substance 12 and probe 36 may cause cantilever 14 to deflect. Optical detector 18 may detect the deflection of cantilever 14. Based on signals from optical detector 18 and feedback controller 20, COIFM 10 may measure the adhesions forces between the sample substance 12 and probe 36.

For example, and as discussed above, the feedback loop may receive an electrical signal 53 related to the deflection of the cantilever 14, and the electrical signal 53 may comprise a normal force component and a friction force component. In one embodiment, the normal force component may comprise a DC component of the electrical signal 53, and the friction force component may comprise an AC component of the electrical signal 53. The normal force component may be measured at the feedback controller 20, while the friction force component may be measured at the lock-in amplifier 74. In some cases, the normal and friction force components may be measured concurrently. For instance, z-axis controller 54 and amplifier 60 may engender movement of piezotube 22 in the z- or vertical axis, while lock-in amplifier 74 and lateral modulator 72 may engender lateral modulation of piezotube 22. In response to the vertical and lateral modulation of the piezotube 22, and as a result of molecular force acting between a sample 12 placed on the piezotube 22 and probe 36 of the cantilever 14, the cantilever 14 may deflect. As cantilever 14 deflects, optical detector 18 may detect the deflection of the cantilever 14 and convert the deflection into an electrical signal 52. The electrical signal 52 may be compared with an electrical signal 50 from a set point 51 to yield an electrical signal 53. Feedback controller 20 may be configured to receive the electrical signal 53 and, as described above, induce circuit element 28 to counteract the deflection of cantilever 14. Also as discussed above, feedback controller 20 may be coupled to lock-in amplifier 74.

In one embodiment, the feedback controller 20 may be configured to measure a DC component of the electrical signal 53. In some cases, the DC component may be converted, using a conversion factor, to lead to a normal force value. Also, the lock-in amplifier 74 may be configured to measure an AC component of the electrical signal 53. Lock-in amplifier 74 may measure amplitude and/or phase of the AC component or related information (e.g in-phase and quadrature components) at a driving frequency of the lateral modulator 72. In some cases, the AC component may be converted, using a conversion factor, to lead to a friction force value. The relationship of normal force and friction force may be represented by the equation:

$$V_{stack} = \frac{3\alpha}{2\beta k_z L_{cant}}\left(F_z + \frac{2L_{tip}}{L_{cant}}F_x\right)$$

In the foregoing equation, $V_{stack}$ may represent the applied voltage 48 to circuit element 28, $\alpha$ may represent a proportional constant, $k_z$ may represent a spring constant, $L_{cant}$ may represent the length of cantilever 14, $L_{tip}$ may represent the probe length, and $F_z$ and $F_x$ may represent the normal and friction forces, respectively. Therefore, the normal force conversion factor may be $2\beta k_z L_{cant}/3\alpha$, and the friction force conversion factor may be $\beta k_z L_{cant}^2/3\alpha L_{tip}$. The derivation and sample calculations of the above equations can be found in the paper: Byung I. Kim et al., *Simultaneous Measurement of Normal and Friction Forces Using a Cantilever-Based Optical Interfacial Force Microscope*, REVIEW OF SCIENTIFIC INSTRUMENTS 82, 05311 (2011), which is hereby incorporated by reference in its entirety.

By way of example, if the probe is made of 1-10Ω cm phosphorus doped Si, with a nominal spring constant ($k_z$) and resonance frequency known to be 3N/m and 50 kHz, respectively, and if the cantilever and probe dimensions are measured to be $L_{cant}$=485 μm and $L_{tip}$=20 μm, respectively. Then, measurements may be taken in ambient conditions with relative humidity of 55%. Tip speed may be chosen to be 10 nm/s, and lateral movement achieved by modulating the sample along the long axis direction of the cantilever with a 1 nm amplitude and a frequency of 100 Hz. Based on these numbers, the amplitude of the AC component may be measured at the lock-in amplifier 74 and the DC component at the feedback controller 20. Based on this information, and using the conversion factors disclosed above, the normal force conversion factor may be calculated to be approximately 5 nN/V and the frictional force conversion factor may be calculated to be approximately 60 nN/V. Of course, one of ordinary skill in the art would recognize that based on any multitude of variables, each respective conversion factor could change significantly.

Additionally, a memory element (not shown) may be coupled to the feedback controller 20 and/or the lock-in amplifier 74 in order to record values measured by each respective element. The measured values may be recorded as a function of distance, wherein the distance is related to the movement of piezotube 22 by the z-axis controller 54 and/or the amplifier 60. In some embodiments, the memory element may be coupled internally to the feedback loop. In other cases, the memory element may be external to the microscope and coupled to the feedback loop through any type of wired or wireless connection, as appropriate.

Figure 5:
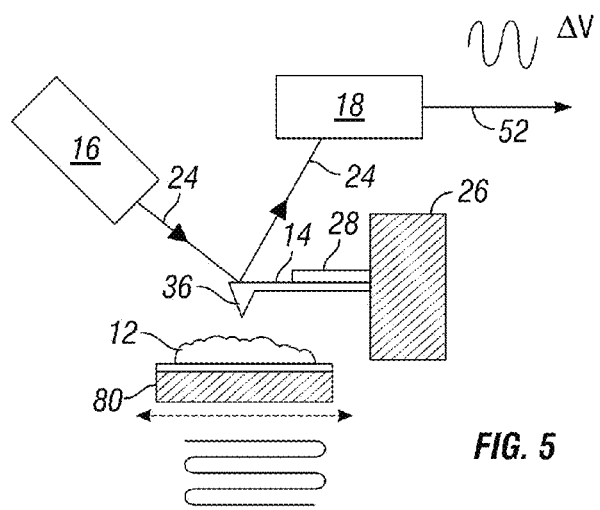
FIG. 5 illustrates the lateral modulation of a tray in a COIFM, according to certain embodiments.

As illustrated in FIG. 5, piezotube 22 may be modulated laterally (e.g., in the x-axis and/or y-axis directions) as piezotube 22 moves the sample substance 12 into contact with probe 36. As the sample substance 12 approaches and retracts from probe 36, lock-in amplifier 74 may detect a voltage signal that indicates the effect of friction forces between the sample substance 12 and probe 36. In some embodiments, COIFM 10 may indicate and/or record information regarding the normal forces, friction forces, and/or the distance between probe 36 and the sample substance 12.

An example illustrates certain embodiments of COIFM 10. In some embodiments, COIFM 10 may measure the effect of interfacial water in micro-electro-mechanical system (MEMS) devices. In such devices, the presence of water may hinder the movement and/or function of micro-electro-mechanical structures. Understanding the effects of interfacial water in MEMS devices may enable designing MEMS devices that effectively operate in humid and/or wet environments.

In the present example, water may be deposited on a tray 80 (e.g., silicon substrate) on piezotube 22 in an ambient environment, as illustrated in FIG. 4. COIFM 10 may be equipped with probe 36 that comprises a silicon tip. COIFM 10 may be placed in an enclosure 76 (e.g., an acryl box) having at least one inlet port 78 for dry nitrogen gas and at least one inlet port 78 for humid water vapor. Appropriate levels of nitrogen gas and water vapor may then be added to enclosure 76 to control the amount of humidity.

In the present example, COIFM 10 may establish a feedback loop between optical detector 18 and circuit element 28 on cantilever 14. Lateral modulator 72 may modulate piezotube 22 in the x-axis and/or y-axis directions as piezotube 22 moves in the z-axis direction to bring the water into contact with probe 36. COIFM 10 may measure both the normal forces and the friction forces between the water and probe 36. COIFM 10 may collect and/or record data as piezotube 22, while modulating, approaches and retracts from probe 36.

In the present example, chains of water molecules may form between probe 36 and tray 80 on piezotube 22. When tray 80 on piezotube 22 is in proximity to the silicon tip of probe 36, the normal forces and friction forces caused by the water chains may oscillate. As the gap distance decreases between probe 36 and tray 80, the force response of the water chains may resemble the force response of a polymer (as opposed to the force response of a spring).

In some embodiments, the water molecules confined between probe 36 and tray 80 on piezotube 22 may form a bundle of water chains through hydrogen bonding. The length of each chain may be approximated by a model called "freely jointed chain" (FJC), in which the individual segments of each water chain move randomly. The FJC model may be expressed by the following equation:

$$\langle z_l \rangle = l \cdot \sigma \left[ \coth\left(\frac{f_l}{n} \cdot \frac{\sigma}{k_B T}\right) - \left(\frac{n}{f_l} \cdot \frac{k_B T}{\sigma}\right) \right]$$

In the foregoing equation, l may represent the number of water joints, σ may represent the diameter of water, f may represent tip force, n may represent the number of water chains, $k_B$ may represent the Boltzmann constant, and T may represent temperature. Applying the FJC model in the present example, the measurements by COIFM 10 may indicate that, as probe 36 approaches tray 80 on piezotube 22, the number of water chains between probe 36 and silicon substrate may increase while the number of water joints in each chain may decrease.

Although the foregoing example describes the use of COIFM 10 to measure interfacial forces associated with water chains, it should be understood that COIFM 10 may be used to measure interfacial forces in any suitable substance.

FIGS. 6-10 illustrate examples of the present disclosure relating to a COIFM configured to image and/or measure material characteristics of soft materials. Briefly, it may be advantageous to scan and image soft materials and measure the materials' characteristics in order to, inter alia, better understand material properties. As disclosed herein, a COIFM may be modified with additional structures to isolate material stiffness, among other things, and may facilitate the ability to detect a force between a cantilever of the COIFM and a sample in both attractive and repulsive force regimes.

Figure 6:
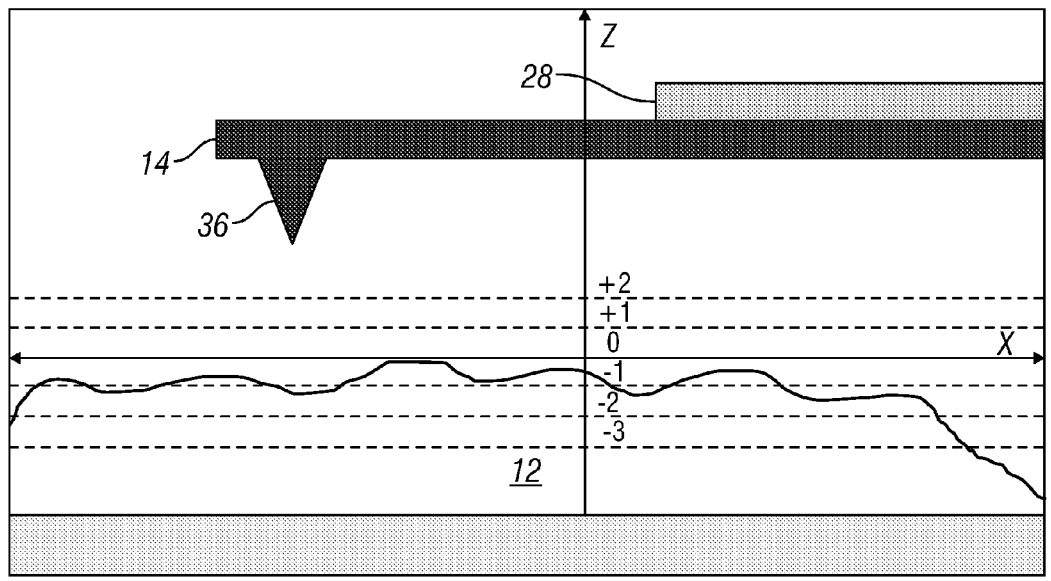
FIG. 6 is a perspective view of a COIFM system for measuring characteristics of soft materials.
Figure 7:
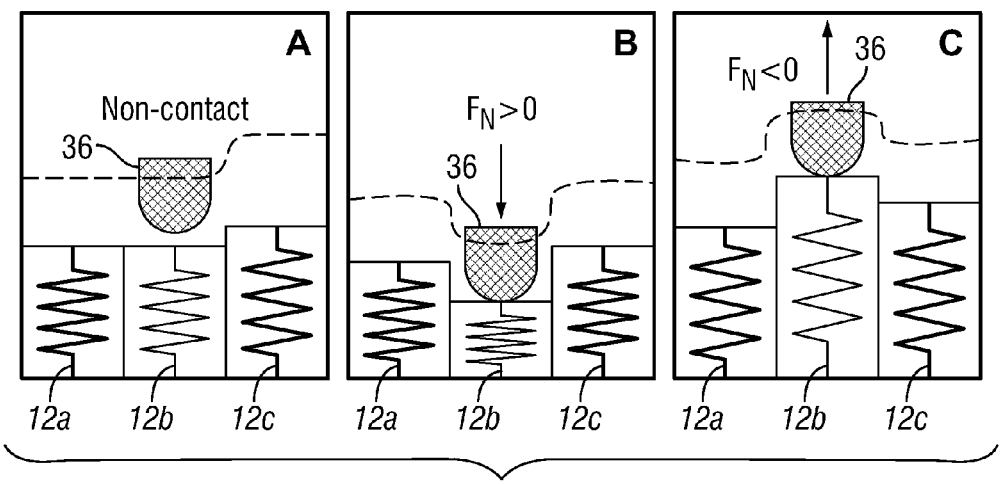
FIGS. 7A-7C illustrate a COIFM system for measuring characteristics of soft materials at different stages of measurement.

FIG. 6 illustrates a cantilever 14 having a probe 36 in proximity to a sample 12 arranged on a tray 80. A circuit element 28, also referred to herein as an actuator, is connected to the cantilever 14 and is configured to resist or counteract deflection of the cantilever 14. For illustrative purposes, an axis is superimposed over the cross-section of the sample 12 and, in this coordinate system, includes an X-axis and a Z-axis, wherein the Z-axis extends approximately vertically and the X-axis extends approximately horizontally. Additionally, a Y-axis may extend perpendicular to both the X- and Z-axes. Of course, these axes are arbitrary and are provided as a coordinate reference framework to illustrate general movement of the sample 12 in reference to probe 36 and other coordinate systems and axes can also be used for illustration. Likewise, for illustrative purposes FIG. 6 also includes unit demarcations along the Z-axis above and below an selected origin (i.e., 0 point). In this illustration, the 0 point in the Z-axis is illustrated at the top-most point of sample 12, and +1 and +2 units are above sample 12, while −1, −2, and −3 are unitary steps below the 0-point on the Z-axis. Of course, other axis demarcations, including logarithmic demarcations, or other non-unitary axis marks may also be used. In one example, the unitary steps may signify μm, while in another example they may signify nm, or other length units, among other things. Other scales, units, or divisions are also possible. In one example, the cantilever 14 and supporting hardware may be configured to detect, measure, and/or sense forces in both the attractive and repulsive regimes.

In one example operation, tray 80 and sample 12 may be arranged in relation to probe 36. The distance along the Z-axis between sample 12 and probe 36 may decrease such that sample 12 and probe 36 come into contact. A different force may be measured at any unitary step such as, for example Z=−3, −2, −1, 0, +1, and +2, among other points. The measured force may be compared with a setpoint and probe 36 may be advanced or retracted based on the comparison. The force may then be measured again. Once a particular point on the X- and/or Y-axis has been measured, in this case, once the force between probe 36 and sample 12 has been measured and the distance fine-tuned, COIFM 10' may scan sample 12 to another point on the X- or Y-axis.

At each step along the Z-axis and each time that probe 36 scans along the X- and Y-axes, a plurality of measurements may be taken. For instance, a deflection measurement may be taken based on deflection of the cantilever 14 in response to forces acting between probe 36 and sample 12. A force measurement may be taken at circuit element 28 as the circuit element 28 resists deflection of the cantilever 14. Additional measurements and/or readings may be taken at other places in the COIFM. For instance, other measurements may include a profile of sample 12, and the stiffness of parts and portions of sample 12 among other things. The measurements and/or readings may be combined and otherwise correlated.

FIGS. 7A-7C illustrate measuring force interactions between a probe 36 and a sample 12 at different unitary steps, setpoints, or distances along a Z-axis. As shown in FIGS. 7A-7C, the sample 12 may be considered to comprise a number of domains, 12a, 12b, and 12c, of differing properties in the sample 12. For example domains 12a, 12b, and 12c may represent areas of different stiffness or other mechanical property. For instance, FIG. 7A illustrates a first example where probe 36 is not in contact with domains 12a, 12b, 12c, but an attractive force may exist between probe 36 and domains 12a, 12b, 12c. Also shown in FIG. 7A is a representative dotted line indicating a profile measurement taken by the COIFM when interacting with the domains 12a, 12b, 12c. FIG. 7B illustrates a second example where probe 36 is contacting sample 12 (e.g., at domain 12b) and is causing deformation of sample 12. This example may demonstrate a force in the repulsive regime. FIG. 7C illustrates a third example where probe 36 is contacting sample 12 (e.g., at domain 12b) and may illustrate a force in the attractive regime.

In operation, a sample or a plurality of domains 12a-12c may be moved in proximity to a probe 36. Forces may exist between a sample 12 and probe 36. In one example, the forces may be categorized into three force regimes. In a first regime, attractive forces may exist between probe 36 and sample 12 when probe 36 and sample 12 (e.g., as shown in FIG. 7A) are not in contact. In a second regime, repulsive forces may exist between probe 36 and sample 12 when probe 36 and sample 12 are in contact (e.g., as shown in FIG. 7B, at domain 12b). And in a third regime, attractive forces may exist between probe 36 and sample 12 (e.g., as shown in FIG. 7C at domain 12b). The measurement of these attractive and repulsive forces may facilitate the creation of an accurate image of sample 12 and of a series of characteristics thereof.

Figure 8:
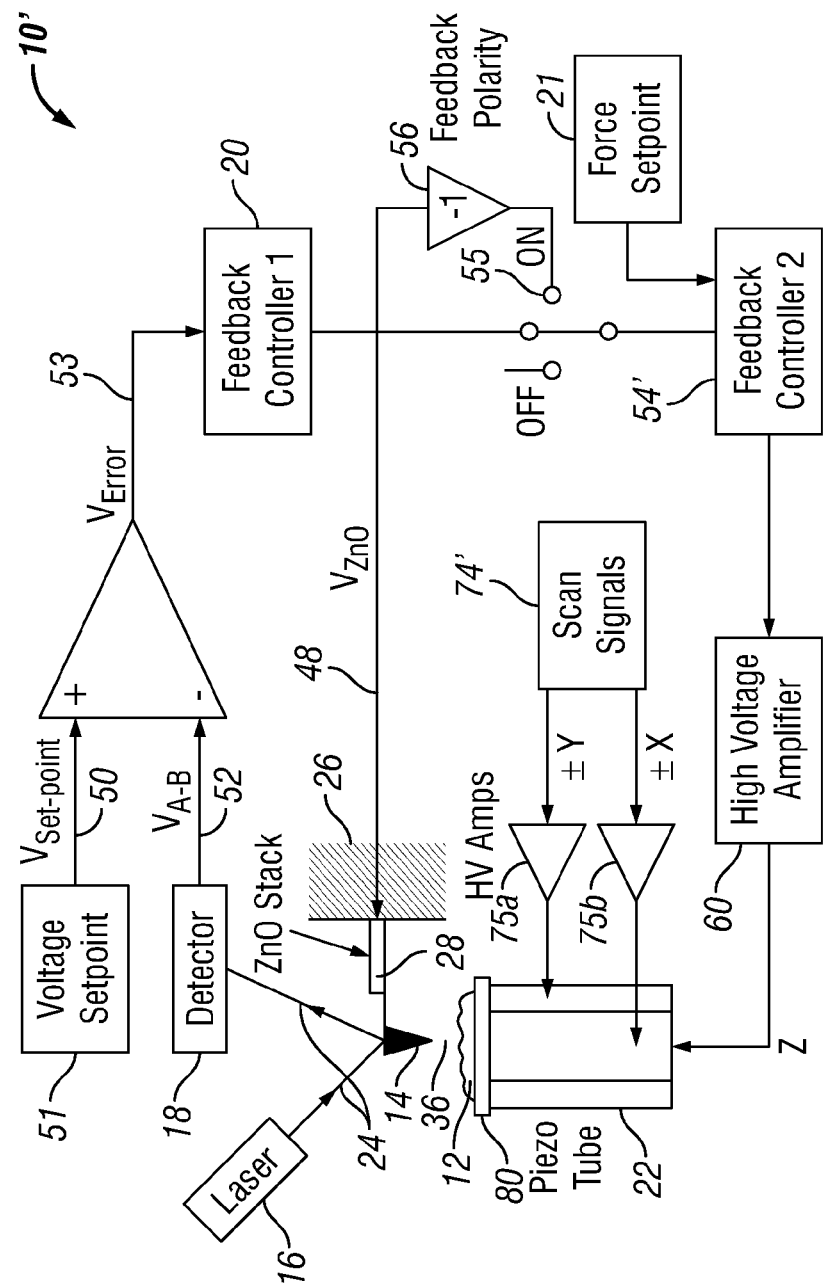
FIG. 8 illustrates a COIFM for imaging soft materials.

FIG. 8 illustrates a COIFM 10' according to the present disclosure. In one example, COIFM 10' includes a cantilever 14 having a probe 36, cantilever 14 being connected to a circuit element 28 and abutting a support 26. A light source 16 may be configured to transmit an optical beam 24 off of cantilever 14 and the reflected optical beam 24 may be detected by an optical detector 18. A signal, in one example voltage 52, from optical detector 18 may be fed into a feedback loop along with a voltage 50 from a voltage setpoint 51. A signal 53 may be inputted into a first feedback controller 20. A signal from the first feedback controller may be inputted into the circuit element 28, which may resist deflection of cantilever 14.

A sample 12 may be placed on a tray 80 of piezotube 22 and placed in proximity to probe 36. Piezotube 22 may be connected to a scan signals source 74' and a pair of high voltage amplifiers 75a and 75b in order to impel movement of piezotube 22 along X- and Y-axes.

A second feedback controller 54' may also be communicably connected to the feedback loop via a switch 55. Feedback controller 54' may feed a signal into a high voltage amplifier 60 and then on to piezotube 22. A signal transmitted from the second feedback controller 54' may cause piezotube 22 to move along a Z-axis. A force setpoint 21 may be configured to set a setpoint value of piezotube 22.

A scan signals source 74' may be communicatively connected to piezotube 22 via high voltage amplifiers 75a and 75b. The combination of scan signals source 74' and the high voltage amplifiers 75a and 75b may be configured to cause movement of piezotube 22 along X- and Y-axes. Scan signals source 74' may comprise any suitable signal source including, but not limited to, a function generator. For instance, scan signals source 74' may comprise a signal generator configured to output a sinusoidal wave. Of course, any other suitable signal source and/or signal waveform may be used according to the present disclosure.

Switch 55 may also be coupled to an inverter 56. Switch 55 may be any suitable switching means or mechanism configured to switch or otherwise direct the flow of current from the first feedback controller 20 towards the circuit element 28 and/or the second feedback controller 54'. Switch 55 may be a three position switch such as an automatic or computer-controlled switch, a rotary switch, a toggle switch, a slide switch, or any other suitable device. Inverter 56 comprises a component configured to invert a signal outputted by the first feedback controller 20 and transmit the inverted signal to the second feedback controller 54'. Inverter 56 may comprise any suitable type or form of inverter including an inverter circuit and/or logical inverter, among other things.

In operation, COIFM 10' may be used to investigate mechanical properties of soft materials. A sample 12 may be placed on a tray 80. Scan signals source 74' may output a signal, which may be amplified by high voltage amplifiers 75a and 75b, and then transmitted to piezotube 22 in order to impel movement of piezotube 22 along X- and Y-axes. As sample 12 and piezotube 22 move in relation to probe 36, one or more forces between probe 36 and sample 12 may act to cause a deflection of cantilever 14. The one or more forces may be attractive and repulsive forces, among other things. A light source 16 may reflect an optical beam 24 off of cantilever 14 and optical detector 18 may detect deflections of cantilever 14 related to the one or more forces acting between probe 36 and sample 12. In one embodiment, a signal 52 related to the deflection of cantilever 14 may be read, sensed, and/or measured. The signal 52 may be transmitted along with a voltage setpoint 51 to achieve a zero error voltage 53, which may be transmitted to the first feedback controller 20. First feedback controller 20 may transmit a signal to circuit element 28 in order to resist deflection of cantilever 14. The signal from first feedback controller 20 may be read, sensed, and/or measured.

In one embodiment, when switch 55 is in an OFF position, an output signal from first feedback controller 20 may be transmitted to circuit element 28. When switch 55 is in a first ON position, the output signal from first feedback controller 20 may be transmitted to a second feedback controller 54'. Second feedback controller 54' may also receive a force setpoint 21 signal, and second feedback controller 54' may output a signal to high voltage amplifier 60, which may in turn transmit a signal to piezotube 22 in order to move or otherwise impel movement of piezotube 22 along a Z-axis. The signal from second feedback controller 54' may be read, sensed, and/or measured.

Switch 55 may be placed in a second ON position, and the output signal from first feedback controller 20 may be transmitted to an inverter 56 and on to the second feedback controller 54'. As described above, second feedback controller 54' may transmit a signal, through high voltage amplifier 60, and on to piezotube 22 in order to impel movement of piezotube 22 along the Z-axis. Further, a signal from second feedback controller 54' may be read, sensed, and/or measured. In one embodiment, inverter 56 may allow COIFM 10' to sense, and/or measure forces in the attractive regime.

The combination of read, sensed, and/or measured signals at, inter alia, optical detector 18, circuit element 28, and second feedback controller 54' may be correlated to arrive at data relating to the mechanical properties of sample 12. For instance, data related to the properties of sample 12 in repulsive and attractive force regimes may provide information as to the molecular structure and properties of sample 12. For example, the data may relate to a stiffness of molecules of sample 12, among other things. In one embodiment, the data may be translated to provide an image of sample 12.

Figure 9:
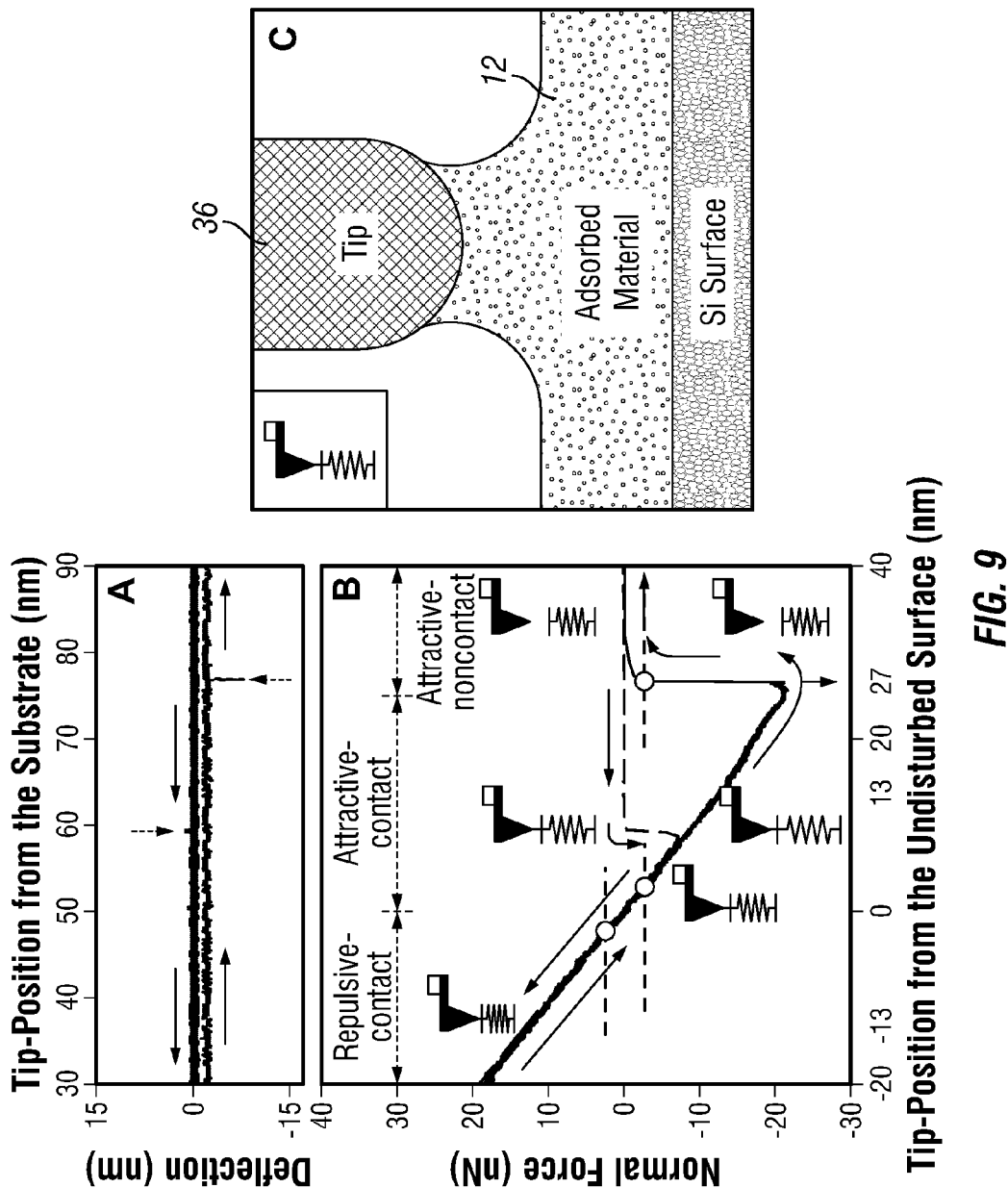
FIGS. 9A-9C illustrate force- and deflection-distance curves according to the present disclosure.

FIGS. 9A and 9B illustrate deflection and force curves measured as a function of distance according to one embodiment. FIG. 9A illustrates cantilever deflection in nm related to the distance between probe 36 and sample 12, in nm. FIG. 9A includes two deflection curves: an upper curve at or slightly above approximately 0 nm deflection, and a lower curve slightly below approximately 0 nm deflection. Four horizontal arrows are also included in FIG. 9 to assist in interpreting the data. The two upper horizontal arrows illustrate that the upper curve was generated as probe 36 approached sample 12. The two lower horizontal arrows illustrate that the lower curve was generated as probe 36 retracted from sample 12. FIG. 9A also includes two vertical arrows, one above the curves, and one below the curves, illustrating points of cantilever deflection before circuit element 28 is able to resist the deflection.

FIG. 9B illustrates a force curve as a function of distance according to one embodiment of the present disclosure. As will be appreciated by one of ordinary skill in the art, FIG. 9A and FIG. 9B are aligned such that the force and deflection measurements may be read as a measure of the same distance according to the shared X-axes. FIG. 9B illustrates that in one embodiment, one or more forces may be detected and measured between probe 36 and sample 12, and that the one or more forces may range from approximately −20 nN and 20 nN. Of course, this range is completely dependent upon a variety of factors which may include the sample 12, the humidity of the location being measured, an altitude of the COIFM 10', the materials of cantilever 14 and probe 36, among other things.

FIG. 9B comprises two force curves that overlap almost entirely except for between approximately 9 nm (tip-position from the undisturbed surface) and approximately 27 nm in which the two force curves separate into an upper and a lower curve. As illustrated by the three arrows following the upper force curve, the force measurements of the upper force curve are related to probe 36 movement towards sample 12. Likewise, the three arrows following the lower force curve illustrate that the lower force curve is related to probe 36 movement away from sample 12. FIG. 9B also illustrates force setpoint 21 values shown with dotted lines. In the contact force regimes, the dotted lines illustrate force setpoint 21 values of approximately 1.25 nN and −1.25 nN, respectively. In the noncontact force regime, the dotted line illustrates force setpoint 21 value of approximately −1.25 nN.

Analyzing the data illustrated in FIGS. 9A and 9B in concert reveals the existence of at least three force regimes: a repulsive-contact force regime (below approximately 0 nm), an attractive-contact force regime (between approximately 0 nm and approximately 27 nm), and an attractive-noncontact force regime (above approximately 27 nm). Additionally, FIG. 9B shows that for at least one embodiment, the forces acting between probe 36 and sample 12 approach zero at approximately 30 nm.

Thus in operation, a probe 36 may approach and retract from a sample 12 and a deflection of a cantilever 14 may be measured. A signal from the optical detector 18 may be transmitted to a circuit element 28, which may counteract the deflection of cantilever 14. A signal at the circuit element 28 may be read, sensed, and/or measured to yield data such as the data illustrated in FIG. 9A. Additionally, the signal from optical detector 18 may be fed through a switch 55 and to a second feedback controller 54' and on to piezotube 22. Switch 55 may switch to either a first ON position or a second ON position and a signal at the second feedback controller 54' may be read, sensed, and/or measured to yield data such as the data illustrated in FIG. 9B. Additional data may be gathered as piezotube 22 moves along X- and Y-axes.

FIG. 9C illustrates an interaction between a sample 12 and a probe 36. As illustrated, due to, among other things, contact forces, sample 12 may exhibit spring-like behavior and "extend" towards probe 36. In one embodiment, sample 12 may behave like a linear spring. In this embodiment, COIFM 10' may allow measurement of material characteristics of sample 12.

Figure 10:
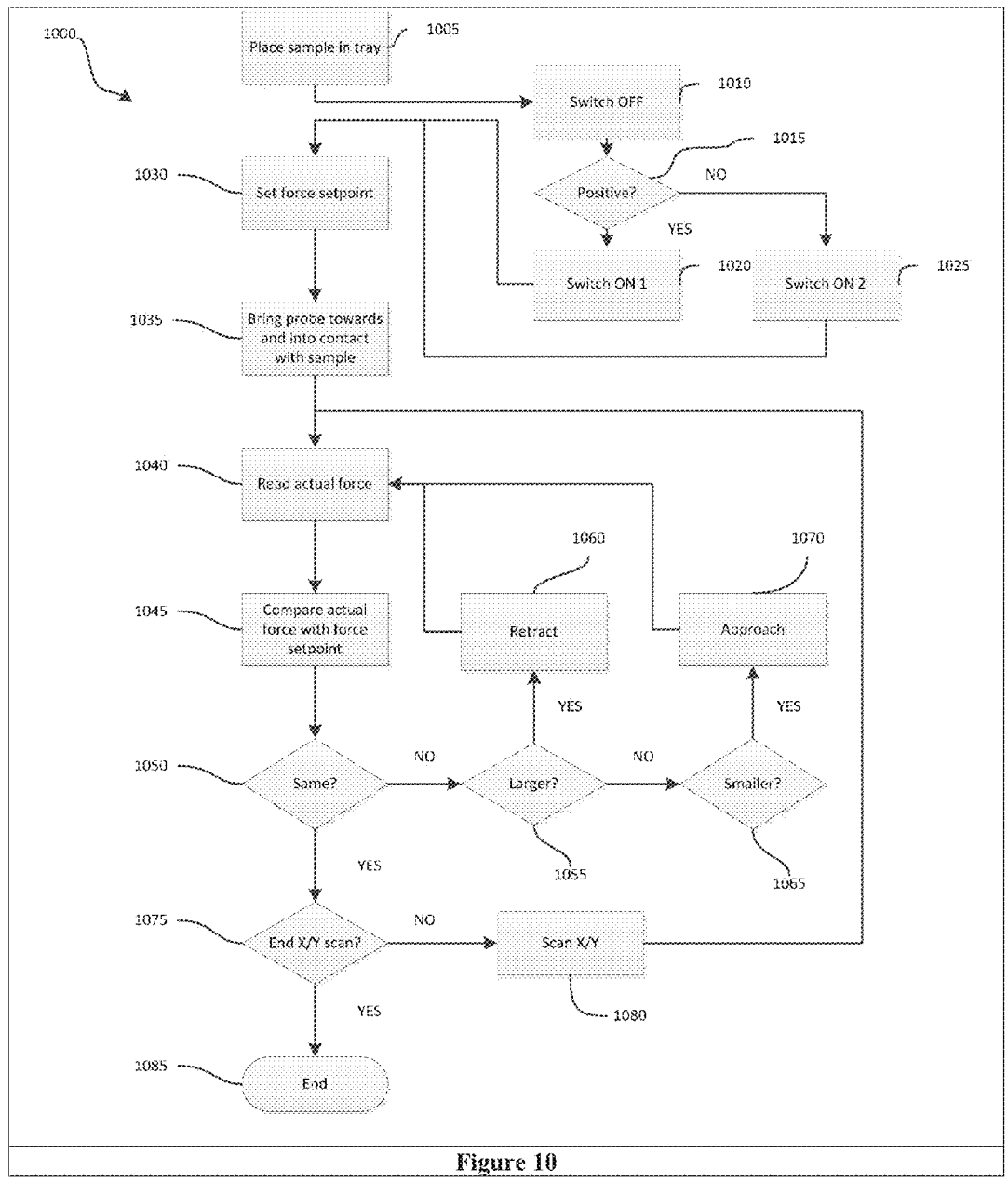
FIG. 10 illustrates a method of scanning a sample according to the present disclosure.

FIG. 10 illustrates a method 1000 of measuring material characteristics of a sample 12 using a COIFM 10'. In a first method step 1005, a sample 12 is placed on a piezotube 22. In some embodiments, a buffer liquid may also be added to tray 80 of piezotube 22.

In a second method step 1010, a switch 55 is put in an OFF position. In one embodiment, placing switch 55 in an OFF position may allow COIFM 10' to evaluate and/or determine the polarity of the particular force regime being measured. For instance, COIFM 10' may determine that the measured forces are associated with a positive force regime. Alternatively, COIFM' may determine that the measured forces are associated with a negative force regime. Thus, in a next method step 1015, COIFM 10' determines whether the polarity of the force regime. If the force regime is positive, then switch 55 is placed in a first ON position in a method step 1020. If the force regime is not positive, then switch 55 is placed in a second ON position in a method step 1025.

In a next method step 1030, a force setpoint for the COIFM 10' is selected and set. In one embodiment, this may comprise physically setting the setpoint using a function generator or any other suitable hardware or software solution. Alternatively, the force setpoint may be set automatically by the COIFM 10' and/or supporting system elements. In one embodiment, the force setpoint may be determined, at least in part, by the polarity determined in method step 1015.

In a next method step 1035, COIFM 10' brings probe 36 towards and into contact with sample 12. In one embodiment, this may comprise transmitting a signal to piezotube 22 via second feedback controller 54'. Of course, a device is also contemplated comprising a cantilever 14 configured to move in relation to piezotube 22. As probe 36 moves towards and comes into contact with sample 12, one or more forces may operate between sample 12 and probe 36 so as to cause cantilever 14 to deflect.

In an additional method step 1040, an actual force may be read, sensed, and/or measured between sample 12 and probe 36. For instance, in one example, a force may be read at circuit element 28. Of course, any other suitable means or methods of reading, sensing, and/or measuring the real force are contemplated by the present disclosure.

In a next step 1045, the actual force is compared with the force setpoint. Next, a step 1050 comprises determining whether the compared forces are the same. If it is determined that the detected actual force is larger than the force setpoint in a method step 1055, then probe 36 may be retracted from sample 12 in method step 1060. If not, however, a method step 1065 comprises determining whether the detected actual force is smaller than the force setpoint. If yes, a next method step 1070 comprises causing probe 36 to approach sample 12 even further. Once either the retraction step 1060 or the approach step 1070 have been completed, COIFM 10' returns to method step 1040 to read the actual force between probe 36 and sample 12. It is to be understood that the association of method steps 1055 and 1065 with steps 1060 and 1070, respectively, may depend on the particular polarity of the force regime, and thus, in other embodiments, the relationship may be different (e.g., a determination that the actual force is larger may lead to approaching probe 36 to sample 12, etc.).

Once it is determined that the actual force and the force setpoint are the same in method step 1050, a next method step 1075 may comprise determining whether the totality of a scan in the X- and Y-axes has been completed. For instance, a sample may be divided into a finite number of points in an X-Y plane, and COIFM 10' may be configured to determine whether each of the finite number of points have been measured. Alternatively, COIFM 10' may be configured to use any other number of means, including but not limited to, vision scanning systems to determine whether the totality of sample 12 has been imaged and/or measured.

If it is determined that the totality of sample 12 has not been scanned, then an additional method step 1080 may comprise scanning along the X- and Y-axes. In one embodiment, this step may comprise sequentially stepping through each point on the X-axis, and then moving to a new point on the Y-axis and rescanning along the totality of the X-axis. Of course, any other scanning patterns and methodologies may be employed. Once COIFM 10' scans sample 12 to a new point on the X- and/or Y-axes, COIFM 10' may return to step 1040 comprising reading the actual force at the new point. Thus, COIFM 10' may loop through its measurement of sample 12 to achieve an overall image.

Once COIFM 10' determines that all of the points on the X-Y plane have been scanned, then the COIFM 10' may terminate the scanning routine in a step 1085.

Many principles discussed in this disclosure are also discussed in Byung I. Kim and Ryan D. Boehm, MECHANICAL PROPERTY INVESTIGATION OF SOFT MATERIALS BY CANTILEVER-BASED OPTICAL INTERFACIAL FORCE MICROSCOPY, SCANNING Vol. 35, Issue 1 (2013), which is hereby incorporated by reference.

The present disclosure encompasses all changes, substitutions, variations, alterations and modifications to the example embodiments described herein that a person having ordinary skill in the art would comprehend. Similarly, where appropriate, the appended claims encompass all changes, substitutions, variations, alterations, and modifications to the example embodiments described herein that a person having ordinary skill in the art would comprehend.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A microscopy device for measuring properties of soft materials, the device comprising:
   a cantilever;
   an actuator connected to the cantilever and configured to resist deflection of the cantilever;
   an optical detector configured to detect deflection of the cantilever, wherein the optical detector is communicably connected to the actuator;
   a piezotube arranged in proximity to the cantilever;
   a first feedback controller communicably connected between the optical detector and the actuator;
   a second feedback controller communicably connected between the optical detector and the piezotube via a switch comprising a first ON position, a second ON position, and an OFF position, and wherein the second feedback controller is configured to impel movement of the piezotube along a Z-axis when the switch is in the first ON position;
   a scan signal source communicably connected to the piezotube and configured to impel movement of the piezotube along an X- and a Y-axis; and
   an inverter coupled to the second ON position of the switch.

2. The microscopy device of claim 1 further comprising a high voltage amplifier communicably connected between the second feedback controller and the piezotube.

3. The microscopy device of claim 1 further comprising a high voltage amplifier communicably connected between the scan signal source and the piezotube.

4. The microscopy device of claim 1 configured to measure a voltage at the actuator and compare the measured voltage with a voltage setpoint.

5. The microscopy device of claim 1 configured to measure a voltage at the second feedback controller.

6. The microscopy device of claim 1 wherein:
   the microscopy device is configured to determine a polarity; and
   the switch is configured to be placed in the first ON position or the second ON position based on the determined polarity.

7. A system for material measurement, the system comprising:
   a cantilever;
   a piezotube arranged in proximity to the cantilever;
   a sample positioned on the piezotube, wherein a force between the cantilever and the sample causes the cantilever to deflect;
   an optical detector configured to detect deflection of the cantilever, wherein the optical detector is communicably connected to an actuator coupled to the cantilever, and further wherein the actuator is configured to resist deflection of the cantilever;
   a switch communicably connected to the optical detector, the switch having at least a first position, a second position, and a third position;
   a feedback controller communicably connected between the switch and the piezotube, wherein the feedback controller is configured to impel movement of the piezotube along a Z-axis;
   an inverter coupled between the optical detector and the switch; and
   a scan signal source coupled to the piezotube and configured to impel movement of the piezotube along an X- and a Y-axis.

8. The system of claim 7 wherein:
   the actuator is configured such that a voltage may be measured at the actuator, and a polarity determined; and
   the switch is configured to be placed in at least one of the first, second, and third positions based on the determined polarity.

9. The system of claim 7 configured to measure forces in both attractive and repulsive force regimes.

10. The system of claim 7 further comprising a high voltage amplifier communicably connected between the feedback controller and the piezotube.

11. The system of claim 7 further comprising a high voltage amplifier communicably connected between the scan signal source and the piezotube.

12. The system of claim 7 configured to measure a voltage at the feedback controller.

* * * * *